US005424759A

United States Patent [19]

Burberry

[11] Patent Number: 5,424,759

[45] Date of Patent: Jun. 13, 1995

[54] DYE ROLLERS FOR LASER THERMAL DYE TRANSFER

[75] Inventor: Mitchell S. Burberry, Webster, N.Y.

[73] Assignee: Eastman Kodak Company, Rochester, N.Y.

[21] Appl. No.: 997,377

[22] Filed: Dec. 28, 1992

[51] Int. Cl.[6] .................... G01D 15/10

[52] U.S. Cl. .................... 347/224

[58] Field of Search .................... 346/76 L, 76 PH, 108, 346/160; 355/256, 259

[56] References Cited

U.S. PATENT DOCUMENTS

| | | | |
|---|---|---|---|
| 4,541,042 | 9/1985 | Kohashi | 346/76 PH |
| 4,588,990 | 5/1986 | Tamura | 346/160 X |
| 4,621,271 | 11/1986 | Brownstein | 346/76 |
| 4,757,332 | 7/1988 | Yuasa | 346/160 |
| 4,764,776 | 8/1988 | Mugrauer et al. | 346/76 L X |
| 4,797,695 | 1/1989 | Konno et al. | 346/160 |
| 4,804,975 | 2/1989 | Yip | 346/76 L |
| 4,939,062 | 7/1990 | Kawanishi et al. | 355/259 X |
| 5,026,146 | 6/1991 | Hug et al. | 346/160 X |
| 5,126,760 | 6/1992 | DeBoer | 346/108 |

FOREIGN PATENT DOCUMENTS

| | | |
|---|---|---|
| 3026595 | 2/1991 | Japan . |
| 2083726 | 9/1981 | United Kingdom . |

*Primary Examiner*—Benjamin R. Fuller
*Assistant Examiner*—Randy W. Gibson
*Attorney, Agent, or Firm*—Dennis R. Arndt

[57] ABSTRACT

A process and apparatus in which a thermal dye is not carried by a donor element or sheet, but is provided in liquid form to a reservoir which supplies the dye to the surface of a donor roller. The dye is transferred to a transparent receiver sheet which is in close proximity to the roller surface, by exposure of the dye to an information-bearing radiation beam which is projected through the receiver member. Such a process and apparatus eliminates the need for a separate dye-donor element, and results in a lower cost process.

13 Claims, 2 Drawing Sheets

DYE ROLLERS FOR LASER THERMAL DYE TRANSFER

CROSS-REFERENCE TO RELATED APPLICATIONS

The present application is related to my co-pending applications, having Ser. No. 996,989, filed Dec. 28, 1992, entitled LASER THERMAL DYE TRANSFER USING REVERSE EXPOSURE, Ser. No. 161,186, filed Dec. 1, 1993," entitled "SOLID DYE ROLLERS FOR THERMAL DYE TRANSFER".

FIELD OF THE INVENTION

The present invention is directed to the generation of prints from electronic data and, more particularly, to a novel thermal printing method and apparatus that employs reverse exposure of the receiver in contact with a dye-bearing roller surface to obtain improved latitude in the printing process.

BACKGROUND OF THE INVENTION

Thermal transfer systems have been used to generate prints from pictures which have been recorded from a color video camera or other electronic source, or which have been stored electronically from any source. Typically, the image is first separated into color separations, e.g. by passing the image through color filters and converting the respective color-separated images into electrical signals representing, for example, the cyan, magenta and yellow images. When the image is to be printed, these electrical signals are individually transmitted to a printer where each color is individually printed to generate a full color image. In one form of a thermal printer cyan, magenta and yellow dye-donor elements (sheets) are placed sequentially face-to-face with a dye-receiving element (sheet) and the mated dye-donor and receiver elements are inserted between a thermal printing head and a platen. The preferred method of thermal printing has heretofore employed the "forward" exposure process wherein the mated sheets are oriented so that the dye-donor sheet is adjacent the thermal printing head which applies heat to the back of the dye-donor sheet to drive the image dye in the forward direction, toward the receiver sheet. The thermal printing head has many heating elements which are sequentially actuated in response to the color signals. The process is then repeated for each of the other colors and a color hard copy is thus obtained which replicates the original image. One such process and apparatus is disclosed in U.S. Pat. No. 4,621,271, which is hereby incorporated by reference.

Other processes of obtaining thermal prints from electronic signals substitute one or more lasers for the thermal printing head. In such systems, the dye-donor sheet includes a material which strongly absorbs at the wavelength of the laser. When the dye-donor is irradiated with the beam of coherent light from the laser, the absorbing material converts the light energy to thermal energy and transfers the heat to the dye in the immediate vicinity, thereby heating the dye to transfer it to the receiver. The absorbing material may be present in a layer beneath the dye and/or it may be admixed with the dye. The laser beam is modulated by the electronic signals which are representative of the shape and color of the original image, so that each dye is heated only in those areas in which its presence is required on the receiver to reconstruct the color of the original object. Further details of this process are found in British Patent No. 2,083,726A, the disclosure of which is also hereby incorporated by reference.

Published Japanese Patent Application No. 03/26595, published Feb. 5, 1991, teaches a laser thermal process in which the exposure is through a transparent receiver sheet, i.e. in the reverse direction toward a dye-donor element in which the light absorbing, heat producing layer is disposed as a discrete layer behind the dye layer. This publication alleges that the method taught therein provides higher print density or faster writing speed. In addition, it states that its method results in less adhesion failure between the dye dye-donor coating and the light absorbing layer than when forward printing through a transparent dye-donor element.

While thermal printing processes. employing both the forward and reverse exposure have been employed in systems employing a discreet layer of light-absorbing, heat-producing material beneath the dye layer, and employing forward exposure in systems employing a light-absorbing, heat-producing material admixed in the dye layer, these processes all share the problem that the final print density is highly susceptible to undesirable variability depending both upon the coating thickness uniformity of the dye layer and the optical density uniformity of the light-absorbing, heat-producing material. In other words, it has been found with all of the foregoing thermal systems, that variations in the coating thickness of the dye-donor dye layer will appear in the final image as undesirable variations in image density. Similarly, any variations in the optical density of the light-absorbing material also results in undesirable image density variations. With the necessity of maintaining very close tolerances in the manufacture of the dye-donor element to control both the optical density of the light absorbing material and the thickness of the dye layer, the cost of the dye-donor element is significantly increased, making the process more expensive and less commercially acceptable.

Still further, it has been found that, in prior art thermal processes employing thick dye layers, e.g., greater than approximately two microns thick, the relationship of power input to print density is non-continuous in that the change in print density resulting from a linear change in power input is not linear; the print density change can be disproportionate to the change in the power input. Such a non-linear density-to-power response makes it difficult, if not impossible, to obtain repeatable, satisfactory results.

According to my above-mentioned, co-pending application Ser. No. 996,989, entitled Laser Thermal Dye Transfer Using Reverse Exposure, it has been found that it is possible to overcome many problems of the prior art in providing a thermal image which is insensitive to donor dye thickness variations, thus permitting less strict manufacturing tolerances and costs, and resulting in a lower cost dye-donor material. At the same time, that application discloses a thermal printing process and apparatus which assures the production of an image in which the density varies linearly with the power level supplied to the radiation-generating device without unwanted discontinuities or variations in the power-to-density relationship which adversely affect the quality of the image produced.

However, the process and apparatus disclosed in that application still employ donor elements or sheets upon which the dye is provided for transfer to a receiver element during the writing process. Such donor elements are consumable during the thermal printing process and constitute a significant portion of the cost of the process.

SUMMARY OF THE INVENTION

Accordingly, it has been found that it is possible to use the reverse exposure process of that invention in a process and apparatus in which the dye material is not carried by a donor element or sheet, but is provide in liquid form to a reservoir which supplies the dye to the surface of a donor roller. Such a process and apparatus overcome the problems of the prior art and provide a thermal image which is insensitive to donor dye thickness variations, permitting less strict manufacturing tolerances and costs, eliminating the need for a separate dye-donor element, and resulting in a lower cost process. At the same time, the present invention provides a thermal printing process and apparatus which assures the production of an image in which the density varies linearly with the power level supplied to the radiation-generating device without unwanted discontinuities or variations in the power-to-density relationship which adversely affect the quality of the image produced.

Accordingly, the present invention provides a method of thermal printing with a liquid thermal printing dye having a light-to-heat converting material mixed therewith. The method comprises the steps of superposing a receiver member transparent to an information-bearing radiation beam with a support member carrying the liquid thermal dye material. An information-bearing radiation beam is generated by supplying an information-bearing power signal to a radiation-generating device, and the thermal dye material is exposed through the receiver member to the information-bearing radiation beam to transfer thermal dye material from the support member to the receiver member to generate an image on the receiver member.

According to another aspect of the present invention, a method is provided for thermal printing with a liquid thermal printing dye having a light-to-heat converting material mixed therewith. The method comprises the steps of supplying the liquid thermal dye to a reservoir which supplies a support roller member arranged to rotate about an axis with at least a portion of the roller periphery being wet by the liquid dye. A receiver member transparent to an information-bearing radiation beam is superposed with the wetted portion of the support roller member at a nip and an information-bearing radiation beam is generated by supplying an information-bearing power signal to a radiation-generating device to expose the thermal dye material at the nip through the receiver member to transfer the thermal dye from said roller member to the receiver member to generate an image on the receiver member.

According to a further aspect of the present invention, a thermal printer is provided for use with a liquid thermal printing dye having a light-to-heat converting material mixed therewith. A support member is arranged to be coated with the liquid dye, and means is provided for coating at least a portion of the support member with the liquid dye. Means is provided for superposing a receiver member with the support member carrying the thermal dye material, with the receiver member being transparent to an information bearing radiation beam. A radiation-generating means is arranged to generate an information-bearing radiation beam from an information-bearing power signal supplied thereto. Means is provided for directing the information-bearing radiation beam through the receiver member to transfer the thermal dye from the support member to the receiver member to generate an image on the receiver member.

According to still another aspect of the present invention, thermal printer is provided for use with a liquid thermal printing dye having a light-to-heat converting material mixed therewith. Means is provided for supplying the thermal dye material including a reservoir and a support roller, with the support roller member being arranged to rotate about an axis with at least a portion of the roller periphery extending into the reservoir to be wet by the liquid dye. Means is provided for superposing a receiver member transparent to an information-bearing radiation beam with the wetted portion of the support roller member at a nip. Means is provided for generating an information-bearing radiation beam including means for supplying an information-bearing power signal to a radiation-generating device. Means is also provided for exposing the thermal dye material at the nip of the receiver member and the roller member through the receiver member to the information-bearing radiation beam to transfer thermal dye material from the roller member to the receiver member to generate an image on the receiver member.

Still further, the present invention provides a thermal printer including a plurality of roller members disposed in a plurality of reservoirs and means for supplying a plurality of different color liquid dyes, one to each reservoir, to generate a multi-color image on the receiver.

Various means for practicing the invention and other feathers and advantages thereof will be apparent from the following detailed description of an illustrative, preferred embodiment of the invention, reference being made to the accompanying drawings.

DESCRIPTION OF THE PREFERRED EMBODIMENT

Figure 1:
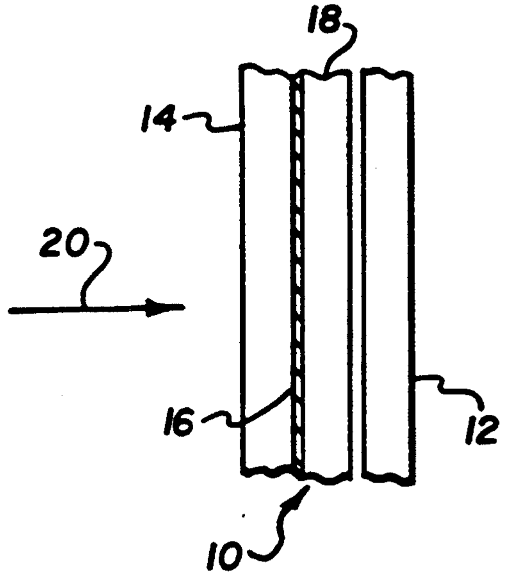
FIG. 1 (PRIOR ART)
FIG. 1 is an illustration of the prior art thermal print process employing exposure in the "forward" direction.

FIG. 1 shows a "forward" exposure process according to the prior art wherein a pair of superposed thermal print elements are illustrated, comprising a dye-donor element 10 and a receiving element or sheet 12 disposed in spaced relationship thereto. The dye-donor element 10 comprises a support member or sheet 14, a layer of a light-absorbing, heat-generating material 16 and a dye layer 18. As taught by the prior art, these components are usually coated as thin films onto a flexible transparent support. The receiver ordinarily consists of a thin polymer film coated on either an opaque or transparent support made of paper or a polymer sheet. A thin gap, having a thickness in the order of microns, is maintained between the dye-donor and the receiver. The gap may be provided by spacers consisting of finely dispersed beads coated on the surface of the dye-donor or the receiver. Such an assembly is exposed in the "forward" direction by an information-bearing radiation beam 20 which is produced by a light source such as a semiconductor laser which is driven by an information-bearing power signal, in a manner well known in the art. The information-bearing radiation beam is directed through the support layer 14, which must be transparent to the radiation beam 20, where the beam is absorbed by the light-absorbing, heat-generating layer 16 and is turned into heat which is transferred to the dye layer 18 in that area, transferring dye to the surface of receiver sheet 12.

Figure 2:
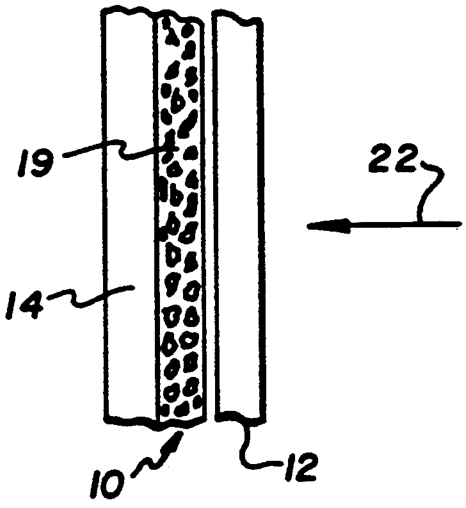
FIG. 2 is an illustration of the thermal print process of the present invention, wherein the light-absorbing, heat-generating material is admixed in the dye layer and showing "reverse" exposure.

According to my above-identified, co-pending application Ser. No. 996,989, various advantages result from the discovery that a thermal print medium having an incorporated light-absorbing, heat-generating material admixed in the dye layer can be advantageously exposed in the "reverse" direction. Such a process is illustrated in FIG. 2, wherein the dye-donor material 10, having a support 14 and dye layer 19 having admixed therewith the light-absorbing, heat-generating material, is exposed by an information-bearing radiation beam 22 entering through the transparent receiver 12 to transfer dye from layer 19 back, in the "reverse" direction, to form an image on the facing surface of the receiver element 12. A dye layer 19 having a light-absorbing, heat-generating material admixed therein is taught in U.S. Pat. No. 5,126,760.

Figure 3:
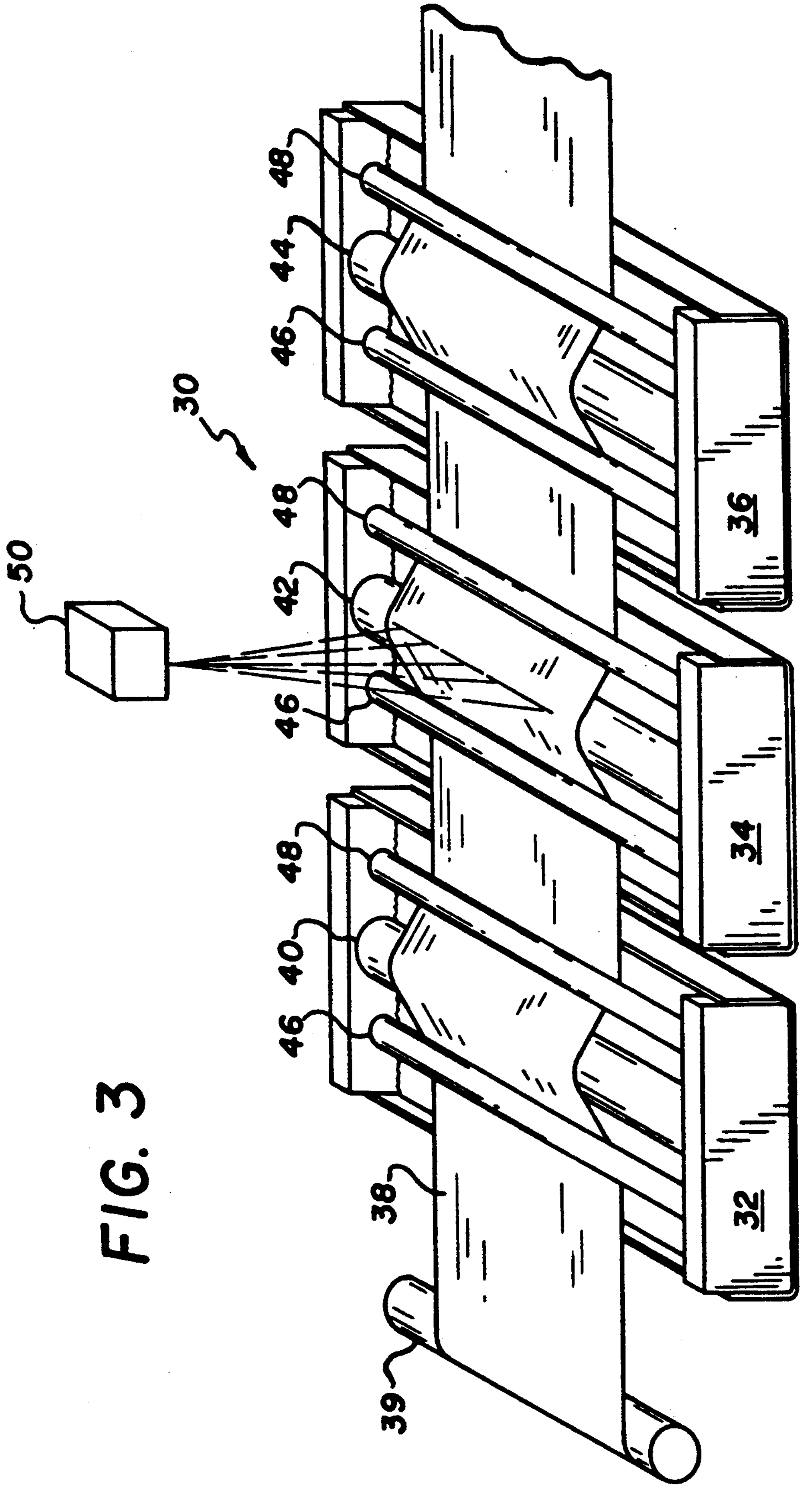
FIG. 3 is an illustration of a thermal printer according to the present invention.

Referring now to FIG. 3, a preferred embodiment of a thermal printer 30 according to the present invention is illustrated. In this embodiment, a plurality of reservoirs 32, 34, and 36 are provided in alignment to permit a web of transparent receiver material 38, supplied, for example, from a supply roll 39, to be transported along a path to intercept a print roller or drum 40, 42, and 44 associated with each of the reservoirs. Each of the print rollers is mounted to rotate about an axis whereby a portion of the roller periphery is immersed in a liquid thermal dye which is held by each of the reservoirs and to carry a predetermined layer of the thermal dye to the top of the roller where it can be contacted by the receiver material. A pair of guide rollers 46 and 48 are arranged on opposite sides, and parallel to, each of the print rollers. The guide rollers are arranged to bring the web of receiver material 38 into contact with the upper surface of each of the print rollers so that a nip is formed between the receiver and the print rollers. A source of information-bearing radiation, such as a semiconductor laser 50, is arranged to scan a line of information-bearing light 52 at the nip of each print roller and receiver to transfer the dye from the roller surface to the facing surface of the receiver in accordance with the information provided to the light source. It will be understood that, although not shown, each of the print rollers is provided with its individual light source. Moreover, it will be understood that each light source can comprise a single source of modulated light which is scanned across the width of the receiver by any form of scanner, as illustrated, or it can comprise a plurality of individual sources, for example diode lasers, which are closely spaced in a linear array disposed in close relationship with the receiver web at each roller nip. Alternatively, the individual light sources can direct light to the roller nip via one or more optical fibers in a manner known by those skilled in the art.

Each of the reservoirs 32, 34, and 36 are provided with means (not shown) for supplying the liquid thermal dye as needed to maintain a selected liquid level therein, or the reservoirs may manually refilled, or they may be single use, disposable dye containers. In a preferred embodiment each reservoir is supplied with a different color dye, e.g. cyan, magenta and yellow, whereby a full color image is generated. The surface of the rollers must be suitable for absorbing or holding the donor dye and may have a hard surface that has been etched with grooves, holes, depressions, cups, or the like, to carry a preselected thickness of thermal dye to the transfer nip, or it may be made of a porous ink absorbant material. The roller should also be a good thermal insulator to prevent the conduction of heat away from the dye layer to permit efficient heating of the dye by the laser for transfer to the receiver.

Alternatively, the dye reservoir can be inside the roller and conducted to the outer surface via conduits, or the roller may be formed of a material porous to the donor dye. The donor material can be selected from the group including a solution of dye (or the dye, the light-absorbing, heat-producing material, and the binder), a low melting wax containing the dye, or a dispersion of dye crystals or dye beads or dye filled microcapsules. The light-absorbing, heat-producing material can be a laser-light absorbing dye, a dispersion of carbon or other pigment or the print roller itself can be light absorbing or surfaced with an absorbing material. A knife or skive can be provided for each print roller to regulate the thickness of dye on the roller surface, removing excess dye before printing and/or reconditioning the roller after printing. The gap between the receiver and the print roller can be provided by the roughness of the roller or by coating spacer beads on or in the receiver or by formulating spacer beads into the liquid dye-donor formula.

The receiver is transported in the direction perpendicular to the roller axis and the nip. The receiver can be supplied or a continuous roll that is cut after printing or as pre-cut sheets. The thermal printing apparatus of the present invention can employ three or four stations, as illustrated, in series to print, for example a multicolor image. Alternatively, the present invention can be employed with a single printing station to form a single color image. The print stations can be arranged in a line or wrapped around a curved surface.

The printed transparent receiver can be used without further treatment or it can be fused to form a transparency, or laminated to a paper support to create a reflection print. The laminating paper can be fed, in line, at the end of the printer and laminated through hot rollers or laminated externally. Still further, the receiver support can be stripped off of the finished print, if a flat finish is desired, or retained to protect the print and provide a glossy finish.

Thus, with the present invention, the printing process can be continuous; for example, a four station printer can simultaneously print full color records of the images. Given a continuous stream of image data, the production rate can equal the print time of one station.

Thus, it will be seen that with the present invention, reversed exposure thermal printing provides a process which is less sensitive to dye coating thickness variations and to limits on the thickness of the dye layer, all without the cost of a consumable dye-donor element. Moreover, the relationship of the image density produced to the laser power (above a power threshold) remains linear over a broad range of conditions. The printing apparatus of the present invention can utilize a donor dye in many forms and laser-induced dye transfer via an exposure through a transparent receiver.

The invention has been described in detail with particular reference to a presently preferred embodiment, but it will be understood that variations and modifications can be effected within the spirit and scope of the invention.

What is claimed is:

1. The method of thermal printing with a liquid thermal printing dye material consisting of a thermal printing dye having a light-to-heat converting material mixed with the thermal dye material and existing as a liquid in a reservoir which supplies a support roller member arranged to rotate about an axis with at least a portion of the roller periphery being coated by said liquid thermal printing dye material, the method comprising the steps of:

superposing a receiver member transparent to an information bearing radiation beam with the thermal printing dye material coating of said support roller member, generating an information-bearing radiation beam by supplying an information-bearing power signal to a radiation-generating device, and exposing said thermal dye material at said superposed receiver member and said roller member through said receiver member to said information-bearing radiation beam to transfer thermal dye material from said roller member to said receiver member to generate an image on said receiver member.

2. The method of thermal printing according to claim 1 wherein said thermal dye on the surface of said support roller member has a thickness substantially greater than about 2 microns.

3. The method of thermal printing according to claim 1 wherein said radiation beam has a wavelength in the infrared region and said receiver member is transparent to infrared radiation.

4. The method of thermal printing according to claim 1 wherein said radiation beam has a wavelength in the visible region and said receiver member is transparent to visible radiation.

5. The method of thermal printing according to claim 1 including the steps of repeating the foregoing steps with the same receiver member at a second roller member coated wet with a second liquid thermal dye to generate a second image.

6. The method of thermal printing according to claim 5 wherein said second image is generated in superposed relationship with said first image to form a multi-color image.

7. A thermal printer with a liquid thermal printing dye material consisting of a liquid thermal printing dye having a light-to-heat converting material mixed therewith, means for supplying the thermal dye material including a reservoir and a support roller, said support roller being arranged to rotate about an axis with at least a portion of a periphery of the roller member extending into said reservoir to be coated by said liquid dye material, means for superposing a receiver member transparent to an information-bearing radiation beam with the coated portion of said support roller member at a contact area, means for generating an information-beating radiation beam including means for supplying an information-bearing power signal to a radiation-generating device, and means for exposing said liquid thermal dye material at the contact area of said receiver member and said roller member through said receiver member to said information-beating radiation beam to transfer liquid thermal dye material from said roller member to said receiver member to generate an image on said receiver member.

8. The thermal printer according to claim 7 wherein said thermal dye material on said support has a thickness substantially greater than about 2 microns.

9. The thermal printer according to claim 7 wherein said radiation beam has a wavelength in the infrared region and said receiver member is transparent to infrared radiation.

10. The thermal printer according to claim 7 wherein said radiation beam has a wavelength in the visible region and said receiver member is transparent to visible radiation.

11. The thermal printer according to claim 7 including a second roller member disposed in a second reservoir and coated with a second liquid dye to generate a second image on said receiver.

12. The thermal printer according to claim 11 wherein said second roller member and reservoir are disposed adjacent said first roller member and reservoir to form a multi-color image on said receiver.

13. The thermal printer according to claim 7 including a plurality of roller members disposed in a plurality of reservoirs and means for supplying a plurality of different color liquid dyes, one to each reservoir, to generate a multi-color image on said receiver.

* * * * *